United States Patent [19]

Kimoto et al.

[11] 4,328,083
[45] May 4, 1982

[54] APPARATUS FOR MIRROR-FINISHING A CYLINDRICAL

[75] Inventors: Yasuo Kimoto, Fujiidori; Katsunori Tamiya, Kobe; Shoichi Honda, Osaka; Hidehiko Maehata, Toyonaka; Hiroshi Kamada, Takatsuki, all of Japan

[73] Assignee: Hitachi Shipbuilding and Engineering Co., Ltd., Osaka, Japan

[21] Appl. No.: 201,335

[22] Filed: Oct. 27, 1980

Related U.S. Application Data

[62] Division of Ser. No. 123,648, Feb. 22, 1980, Pat. No. 4,294,673.

[30] Foreign Application Priority Data

| Feb. 24, 1979 | [JP] | Japan | 54-20919 |
| Mar. 27, 1979 | [JP] | Japan | 54-36618 |
| May 2, 1979 | [JP] | Japan | 54-55086 |
| May 2, 1979 | [JP] | Japan | 54-55087 |
| Aug. 15, 1979 | [JP] | Japan | 54-104313 |
| Aug. 15, 1979 | [JP] | Japan | 54-104314 |
| Aug. 15, 1979 | [JP] | Japan | 54-104315 |

[51] Int. Cl.$^3$ .................. B23P 1/10; B23P 1/12; B23P 1/20
[52] U.S. Cl. .................. 204/217; 204/224 M; 204/225
[58] Field of Search ............. 204/212, 217, 224 M, 204/129.46, 225, 129.6

[56] References Cited

U.S. PATENT DOCUMENTS

| 3,285,843 | 11/1966 | Blake | 204/129.46 X |
| 3,448,023 | 6/1969 | Bell | 204/217 |
| 3,619,401 | 11/1971 | Eisner | 204/217 |
| 4,140,598 | 2/1979 | Kimoto et al. | 204/129.46 X |

FOREIGN PATENT DOCUMENTS

| 50-31866 | 10/1975 | Japan | 204/129.46 |
| 51-107242 | 9/1976 | Japan | 204/129.46 |

Primary Examiner—Delbert E. Gantz
Assistant Examiner—Donald R. Valentine
Attorney, Agent, or Firm—Birch, Stewart, Kolasch & Birch

[57] ABSTRACT

In a method of mirror-finishing a cylindrical workpiece, according to which, with an abrasive matter and an electrolyte disposed at and supplied to each of the gaps between a cylindrical workpiece connected to the anode of a power supply and working electrodes connected to the cathode of the power supply and disposed oppositely to the outer surface or the inner surface of said cylindrical workpiece, an anodic liquation operation by electrolysis performed onto metal in the surface to be treated of the cylindrical workpiece is assisted with an abrasive operation by which anodic passive films generated on the surface to be treated are mechanically abrased by the abrasive matters, whereby the projected portions of the surface to be treated are electrolytically liquated and abrased preferentially, said method is characterized in that an electrolyte in a passive state is used, an electrolytic voltage to be used is in the range from a few V to about 15 V, the density of an electrolytic current to be used is about 10A/cm$^2$ or less, the abrasive matter has a water-permeable property, the pressing force of the abrasive matters to the surface to be treated is 0.5 kgf/cm$^2$ or more, the abrasive speed of the abrasive matters is 2 m/s or more, and the cycle which a portion of the surface to be treated is faced to the working electrodes is in the range from 20 to 200 ms.

6 Claims, 19 Drawing Figures

Fig.19

APPARATUS FOR MIRROR-FINISHING A CYLINDRICAL

This application is a divisional, of copending application Ser. No. 123,648, filed on Feb. 22, 1980, now U.S. Pat. No. 4,294,673.

According to the method of the present invention, the outer surface or the inner surface of a cylindrical workpiece may readily, easily and efficiently be mirror-finished so as to have surface roughness of about 0.1 μm Rmax or less with the roundness of a cylindrical workpiece being a few μm.

There is also provided a mirror-finishing apparatus capable of performing a continuous long-term mirror-finishing with improved working efficiency, by abrasive matter feed mechanisms, a swivelling mechanism, a moving mechanism or the like.

BACKGROUND OF THE INVENTION

Conventionally, the outer surface or the inner surface of a cylindrical workpiece made of stainless steel, plain carbon steel, non-ferrous metal, etc. has been mirror-polished according to the turning or grinding method with the use of a super-precision lathe or a grinder in which diamond tools are disposed. According to such method, however, an amount of metal in a workpiece to be removed by the tools has been extremely small and the polishing speed has therefore been low. Furthermore, since mechanical precision such as the deflection of the machine tool main body or thermal deformation of a workpiece has exerted an influence directly upon machining precision, it has been required to provide particular measures for maintaining machining precision to a predetermined degree. In view of the foregoing, such conventional method has not been suitable particularly for mirror-polishing a large-sized cylindrical workpiece.

Therefore, a large-size cylindrical workpiece has conventionally been polished by using a hand polishing tool. However, according to such method, not only a working efficiency has been low, but also it has been difficult to obtain a clean finished surface having high precision and to perform a polishing operation with a low cost.

Electrolytical polishing has also been proposed, but since ordinary electrolytical polishing has required an electrolyte of a strong acid, the working efficiency has been low. Moreover, mechanical prearrangements have been required.

There has also been proposed a method according to which a water-permeable abrasive matter has been disposed at and an electrolyte has been supplied to the gap between working electrodes and the outer surface to be treated of a cylindrical workpiece, and the cylindrical workpiece has been rotated, and a direct current or a pulsating voltage has been supplied to the gap between the working electrodes and the cylindrical workpiece to generate anodic passive films on the surface to be treated, and projected portions of the surface to be treated have been removed by abrasion and electrolytical liquation. According to such method, however, the finishing ability of the abrasive matter has been lowered with the lapse of time, resulting in the insufficiency of the finishing amount of the surfaces to be treated. There has been proposed to replace a used abrasive matter with a new one with the finishing operation interrupted. In such a case, however, an increase in finishing force due to the replacement of the abrasive matter has generated excessive finishing traces on the surface to be treated, whereby a uniformly finished surface could not be obtained. In addition, the working efficiency has been decreased.

According to any of the conventional methods, the minimum surface roughness to be obtained is 0.2 to 0.3 μm Rmax, and it is difficult to obtain a uniform surface having surface roughness of 0.1 μm Rmax or less, and it is not possible to obtain the roundness of a cylindrical workpiece of a few μm or less.

OBJECTS OF THE INVENTION

It is an object of the present invention to provide a method of mirror-finishing a cylindrical workpiece, according to which anodic liquation by electrolysis performed onto metal in the surface to be treated is combined with abrasion by which anodic passive films formed on the surface to be treated are mechanically abrased and removed by abrasive matters such as abrasive clothes, buffs or abrasive grains, thereby to electrolytically liquate and abrase preferentially projected portions of the surface to be treated, whereby the outer surface or the inner surface of the cylindrical workpiece may be mirror-polished readily, easily and efficiently so as to have surface roughness of about 0.1 μm Rmax or less with the roundness of the cylindrical workpiece being a few μm.

It is another object of the present invention to provide apparatus for mirror-finishing a cylindrical workpiece, in which the finishing amount of a workpiece is not decreased due to the deterioration of abrasive matters and it is not required to interrupt the finishing operation for replacing abrasive matters, whereby uniform mirror-finishing may be performed with high efficiency and a low cost.

BRIEF DESCRIPTION OF THE DRAWINGS

The invention will be further described by way of example, with reference to the accompanying drawings, in which.

DETAILED DESCRIPTION OF PREFERRED EMBODIMENTS

The description will first be made of a method of mirror-finishing a cylindrical workpiece according to the present invention.

Figure 1:
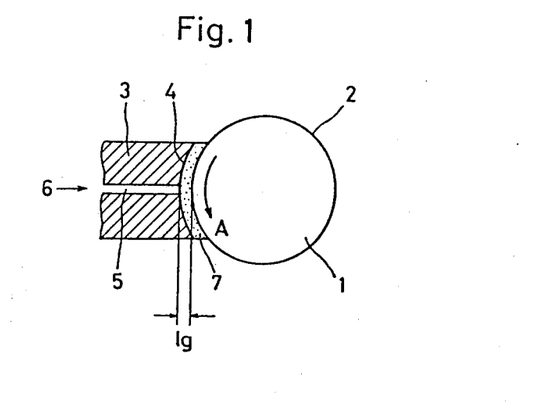
FIG. 1 is a partially sectional view of a first example of a tool to be used in a method of mirror-finishing a cylindrical workpiece according to the present invention.

FIG. 1 illustrates one example of a tool to be used in the present invention. In FIG. 1, a cylindrical workpiece 1 having an outer surface 2 to be mirror-finished is adapted to be rotated in the direction of the arrow A by a suitable moving mechanism and is connected to the anode of a power supply.

A working electrode 3 is disposed adjacent to the outer surface 2 of the cylindrical workpiece 1 with a distance 1g provided therebetween, and is connected to the cathode of the power supply. The electrode surface 4 of the working electrode 3 is formed into a concaved curved surface having a radius slightly larger than the radius of the outer surface 2 of the cylindrical workpiece 1 and is disposed oppositely to the outer surface 2 of the cylindrical workpiece 1 with a distance provided therebetween. The working electrode 3 has an electrolyte supply port 5 through which an electrolyte 6 is adapted to be supplied and which is opened in the electrode surface 4.

An abrasive matter 7 having water-permeable and electrically insulating properties is disposed between the electrode surface 4 and the outer surface 2 of the cylindrical workpiece 1. The abrasive matter 7 may be formed with an abrasive cloth, a buff or abrasive grains, alone or in suitable combination thereof. The abrasive matter 7 prevents a short-circuit from being caused between the cylindrical workpiece 1 and the electrode surface 4 of the working electrode 3, and maintains the electrolytical gap therebetween. It is desirable that the abrasive matter 7 has a thickness of 0.5 mm or more.

In order to dispose the abrasive matter 7 between the cylindrical workpiece 1 and the electrode surface 4, the abrasive matter 7 may be attached to a suitable portion of the electrode surface 4 or abrasive grains may be mixed into the electrolyte 6.

The outer surface 2 of the cylindrical workpiece 1 is mirror-finished in such a way that the electrode surface 4 of the working electrode 3 is oppositely faced to the outer surface 2 of the cylindrical workpiece 1 with a distance of 1 to 2 mm provided therebetween, and the electrolyte 6 is supplied to the gap between the electrode surface 4 and the outer surface 2 of the cylindrical workpiece 1 through the supply port 5 of the working electrode 3 from an external electrolyte supply device, and the cylindrical workpiece 1 is then rotated, and the abrasive matter 7 is pressed to the outer surface 2 of the cylindrical workpiece 1 through the electrode surface 4, and the cylindrical workpiece 1 and the working electrode 3 are connected to the anode and the cathode of a direct current or pulsating electrolytic power supply, respectively, and the cylindrical workpiece 1 or the working electrode 3 is moved axially of the cylindrical workpiece 1. Furthermore, arrangements are made so that an electrolyte in a passive state such as a 20% sodium nitrate solution is used, an electrolytic voltage to be used is ranged from a few V to about 15 V, the density of an electrolytic current to be used is about 10 A/cm$^2$ or less, the pressing force of the abrasive matter 7 to the surface to be treated is 0.5 kgf/cm$^2$ or more, the abrasive speed of the abrasive matter 7 is 2 m/s or more, and a cycle which a portion of the surface to be treated is faced to the working electrode 3, is within the range of 20 to 200 ms.

With the arrangements above-mentioned, anodic liquation by electrolysis performed onto metal in the surface to be treated is combined with abrasion by which anodic passive films generated on the surface to be treated are mechanically abrased and removed by means of the abrasive matter, so that projected portions of the surface to be treated are electrolytically liquated and abrased preferentially, whereby the outer surface of a cylindrical workpiece may be mirror-finished easily, readily and efficiently so as to have surface roughness of about 0.1 μm Rmax with cylindrical workpiece roundness being a few μm.

The detailed description of the invention will further be made in the following.

Figure 2:
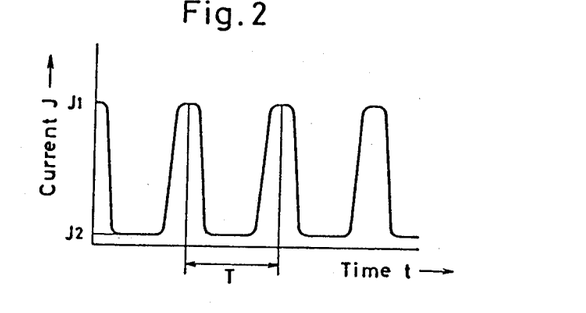
FIG. 2 is a characteristic curve of a current flowing during the time mirror-finishing is performed.

The current J flowing at a portion of the surface to be treated varies in the range from the current J1 when said portion is faced to the working electrode 3, to the current J2 when said portion is not faced to the working electrode 3, as shown in FIG. 2. By such variation in the current J, mirror finishing is performed as follows: during the period the current J2 flows, an anodic passive film is formed on the projected and concaved portion of said portion of the surface to be treated; when said portion of the surface to be treated is then faced to the working electrode 3, such anodic passive film formed at the projected portion is abrased and removed by the abrasive matter 7 and the current flowing at the projected portion is increased to become the current J1; then, the projected portion is electrolytically liquated preferentially and selectively; thereafter, such operations are repeated, so that only such projected portion of the surface to be treated may be finished.

The description will then be made of the cycle T which a portion of the surface to be treated is faced to the working electrode 3.

Figure 3:
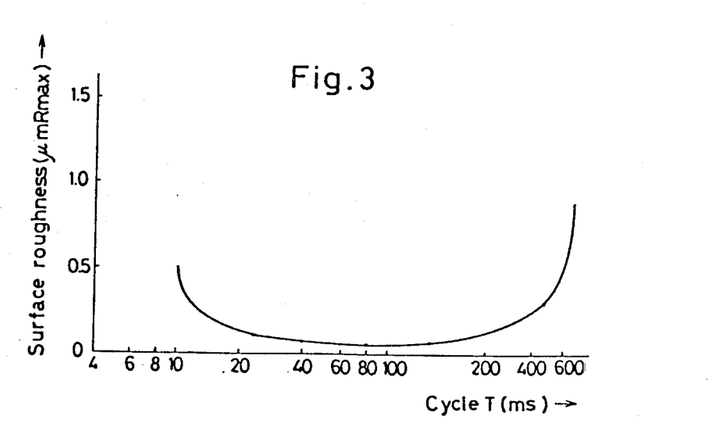
FIG. 3 is a characteristic curve showing the relationship between surface roughness and the cycle which a portion of the surface to be treated is faced to the working electrodes.

FIG. 3 shows the relationship between such cycle T and surface roughness. As apparent from FIG. 3, a suitable range of the cycle T for obtaining surface roughness of 0.5 μm Rmax or less is from 10 to 600 ms. Namely, under the condition of T<10 ms, the removal amount of the surface to be treated is extremely small and a well treated surface may not be obtained due to the insufficiency of a period of time necessary for generating anodic passive films, and scattering of the electrolyte.

On the other hand, if T is greater than 600 ms, the anodic passive films generated on the concaved portions of the surface to be treated are broken and such concaved portions are electrolytically liquated simultaneously with the electrolytical liquation of the projected portions. Therefore, as the cycle T becomes greater, surface roughness is deteriorated.

As also apparent from FIG. 3, the cycle T suitable for obtaining surface roughness of about 0.1 μm Rmax or less should be in the range from 20 to 200 ms.

The description hereinafter will discuss the abrasing speed of the abrasive matter 7.

Figure 4:
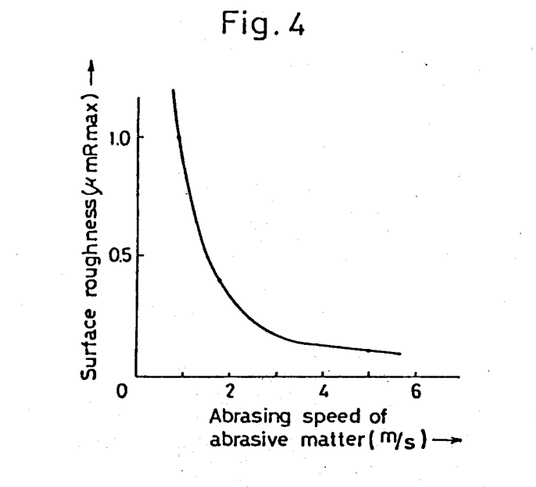
FIG. 4 is a characteristic curve showing the relationship between the abrasive speed of an abrasive matter and surface roughness.

FIG. 4 shows the relationship between the abrasing speed of the abrasive matter 7 and surface roughness. As apparent from FIG. 4, in order to obtain surface roughness of 0.5 μm Rmax or less, the abrasing speed of the abrasive matter should be 2 m/s or more. Namely, the condition of the abrasing speed lower than 2 m/s, since the anodic passive films may not sufficiently removed by means of the abrasive matter, the removal amount of the surface to be treated is extremely small and surface roughness is deteriorated.

The description hereinafter will discuss the pressing force of the abrasive matter 7 to the surface to be treated.

Figure 5:
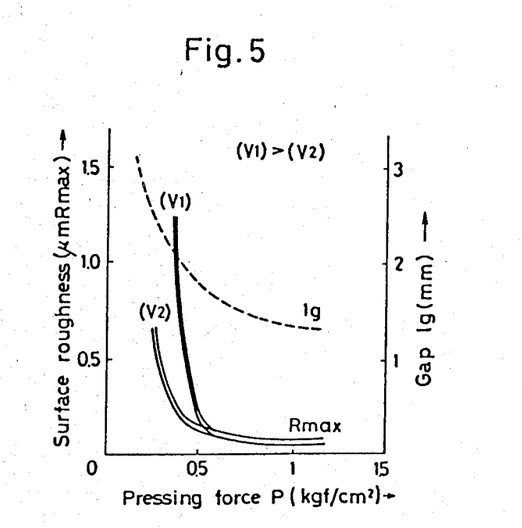
FIG. 5 is a characteristic curve showing the relationship among the pressing force of the abrasive matter to the surface to be treated, the gap between the surface to be treated and the electrode surface, and surface roughness.

FIG. 5 shows the relationship among the pressing force P of the abrasive matter to the surface to be treated, the gap $1g$ between the outer surface 2 of the cylindrical workpiece 1 and the electrode surface 4 of the working electrode 3, and surface roughness to be obtained.

The pressing force P of the abrasive matter 7 is dependent on the gap $1g$. The broken line in FIG. 5 shows the pressing force P of the abrasive matter 7 having a thickness of 5 mm.

As apparent from FIG. 5, the pressing force P becomes greater as the gap $1g$ is decreased. As also apparent from the solid lines in FIG. 5, surface roughness is dependent on the pressing force P of the abrasive matter 7.

It is to be noted that such data were obtained under the conditions of a cylindrical workpiece having a size of $\phi 20$ to $\phi 100 \times 500$, the initial surface roughness of 25 μm Rmax or less, the deflection of the cylindrical workpiece due to rotation being from 0.01 to 0.04 mm, the working electrode having a width of 40 mm, a height of 15 to 60 mm dependent on the dimensions of the cylindrical workpiece and an area of 7 to 26 cm$^2$, the electrolytic voltage of 9 V, the electrolytic current of 10 to 50 A, the electrolyte of a 20% sodium nitrate solution, the cylindrical workpiece being rotated with about 500 rpm. and the feed speeds of the working electrode moved axially of the cylindrical workpiece being V1=12 mm/min. and V2=4 mm/min., respectively.

As apparent from FIG. 5, better surface roughness is obtained as the pressing force P of the abrasive matter becomes greater. In both cases of the feed speeds V1=12 mm/min. and V2=4 mm/min., surface roughness from 0.05 to 0.1 μm Rmax is obtained with P being 0.5 kgf/cm$^2$ or more.

On the contrary, when the pressing force P of the abrasing matter becomes smaller than 0.5 kgf/cm$^2$, surface roughness is rapidly deteriorated. Such phenomenon is remarkable when the working electrode feed speed V is higher.

It is understood from the relationship between the pressing force P of the abrasive matter and the gap $1g$ between the outer surface 2 of the cylindrical workpiece 1 and the electrode surface 4 of the working electrode 3 shown in FIG. 5 that $1g$ is 1.8 mm when P is 0.5 kgf/cm$^2$ and $1g$ is 1.4 mm when P is 1 kgf/cm$^2$; namely, $1g$ may be in a relatively wide range provided that the pressing force P of the abrasive matter satisfies the condition suitable for obtaining stable surface roughness of about 0.1 μm Rmax (P>0.5 kgf/cm$^2$). Therefore, the precision of positioning the working electrode 3 may be about 0.1 mm.

On the other hand, when in FIG. 1 the deflection of the cylindrical workpiece 1 is great or its roundness is worse and the gap $1g$ between the outer surface 2 of the cylindrical workpiece 1 and the electrode surface 4 of the working electrode 3 becomes great, both the pressing force of the abrasive matter 7 and the electrolytic current are decreased.

On the contrary, when the gap $1g$ between the outer surface 2 of the cylindrical workpiece 1 and the electrode surface 4 becomes smaller, both the pressing force of the abrasive matter 7 and the electrolytic current are increased to accelerate abrasion, thereby to permit the shape of the cylindrical workpiece to be modified.

The description hereinafter will discuss the results of a test performed on the present invention.

Under the conditions of a cylindrical workpiece having a dimension of $\phi 30 \times 400$, the initial surface roughness of 20 μm Rmax or less, the initial roundness of 4 to 7 μm, the deflection of the cylindrical workpiece due to rotation of 0.01 to 0.04 mm, the working electrode having a width of 40 mm, a height of 20 mm, an cathode area of 8.4 cm$^2$ and an electrode area of 16.5 mmR, the electrolytic voltage of 9 V, the electrolytic current of 14 A, the electrolyte of a 20% sodium nitrate solution, the pressing force of abrasive matter of about 1 kgf/cm$^2$, the cylindrical workpiece being rotated at about 500 rpm. and the feed speed of the working electrode being about 8 mm/min., the cylindrical workpiece was mirror-finished so as to have surface roughness of 0.05 to 0.1 μm Rmax and roundness of 1.5 to 3 μm with a decrease in the diameter of the cylindrical workpiece being 0.04 to 0.06 mm. The foregoing apparently indicates that, even though the cylindrical workpiece is rotatingly deflected from 10 to 40 μm, it is possible to provide a mirror-finished surface having surface roughness of 0.05 to 0.1 μm Rmax with roundness in the μm order. Furthermore, it is understood from the amount of decrease in the workpiece diameter that only the projected portions of the surface to be treated of the cylindrical workpiece are removed to provide a smoothed and mirror-finished surface.

The description hereinafter will discuss a second example of a tool used in the present invention with reference to FIG. 6.

Figure 6:
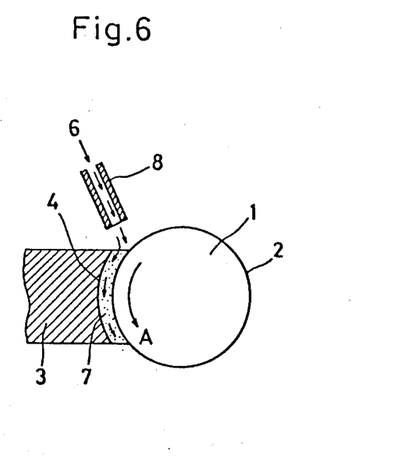
FIG. 6 is a partially sectional view of a second example of a tool to be used in the present invention.

It is to be noted that like parts in FIG. 6 are designated by like numerals used in FIG. 1.

In this example, a working electrode 3 is not provided with an electrolyte supply port as done in the example shown in FIG. 1. An electrolyte 6 is adapted to be supplied to the gap between the outer surface 2 of a cylindrical workpiece 1 and the electrode surface 4 of the working electrode 3, by means of a nozzle 8 formed independently from the working electrode 3. Likely in the case shown in FIG. 1, in this example the outer surface 2 of the cylindrical workpiece 1 is mirror-finished by electrolysis in combination with abrasion.

The description hereinafter will discuss a third example of a tool used in the present invention with reference to FIGS. 7 and 8.

Figure 7:
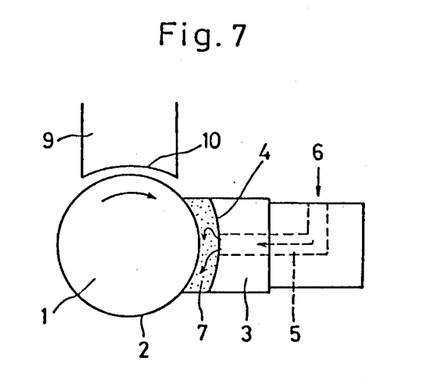
FIG. 7 is a front view of a third example of a tool to be used in the present invention.
Figure 8:
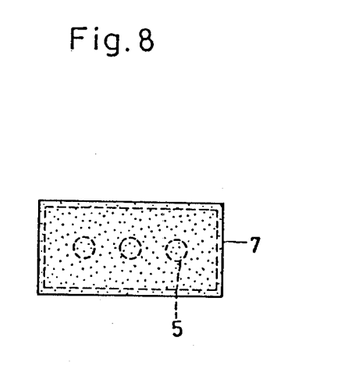
FIG. 8 is a side view of the tool illustrated in FIG. 7.

It is also to be noted that like parts in FIG. 7 are designated by like numerals used in FIG. 1.

In this example, an auxiliary electrode 9 is disposed in addition to a working electrode 3 shown in FIG. 1. No abrasive matter is disposed between the electrode surface 10 of this auxiliary electrode 9 and the outer surface 2 of a cylindrical workpiece 1. This auxiliary electrode 9 is disposed oppositely to the outer surface 2 of the cylindrical workpiece 1 with a distance of 1 to 2 mm provided therebetween, and is connected to the working electrode 3 in a unitary construction therewith. Both electrodes 9 and 3 are moved axially of the cylindrical workpiece 1. Applied to the auxiliary electrode 9 is a voltage lower than a voltage to be applied to the working electrode 3.

Figure 9:
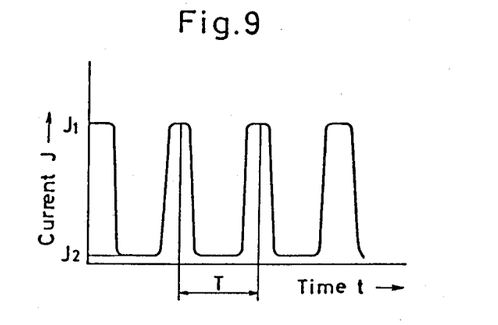
FIG. 9 is a characteristic curve of a current flowing during the time mirror-finishing is performed with the tool in FIG. 7 used.

When a portion of the outer surface 2 of the cylindrical workpiece 1 is faced to the auxiliary electrode 9, a current flowing to that portion is J2 as shown in FIG. 9 and anodic passive films are generated on the concave and projected portions of the surface to be treated in the vicinity of said portion. When the cylindrical workpiece 1 is then rotated so that said portion is faced to the working electrode 3, the anodic passive film generated on the projected portion is abrased and removed by abrasive matter, and a current flowing at said portion is increased and reaches J1, and the projected portion is therefore preferentially and selectively electrolysed and liquated. Repetition of such operations permits only the projected portion of the surface to be treated, to be mirror-finished.

Generally speaking, the density of an electrolytic current to generate anodic passive films is 0.1 A/cm$^2$ or less.

The description hereinafter will discuss the result of a test performed with the tool in FIG. 7 used.

Under the conditions of the working electrode 3 being a copper electrode and having a width of 40 mm, a height of 20 mm and an electrode surface having a radius of 16 mmR, the cylindrical workpiece 1 having a diameter of 300 mm$\phi$, the abrasive grains of #600 to #800 attached to an abrasive matter 7 and the electrolyte 6 of a 20% sodium nitrate solution, a 6 to 9 V direct current voltage was applied and the electrolyte 6 was supplied to the gap between the working electrode 3 and the cylindrical workpiece 1 being rotated. Then, the current flowing at the portion of the surface to be treated facing to the working electrode 3 reached J1, and a leakage current J2 flowed at the portion of the surface to be treated not facing to the working electrode 3, to generate an anodic passive film thereon.

Accordingly, when the cylindrical workpiece 1 has a diameter relatively small and the electrolyte 6 is attached sufficiently to the surface to be treated, it is not always necessary to dispose the auxiliary electrode 9.

Figure 10:
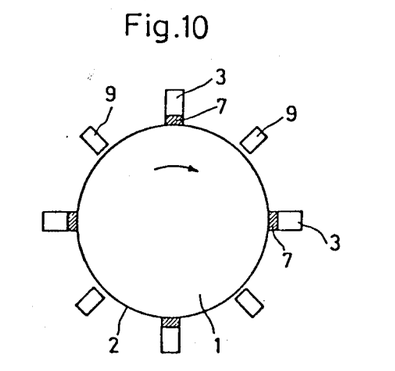
FIG. 10 is a front view of a forth example of a tool to be used in the present invention.

The example in FIG. 7 shows a cylindrical workpiece having a diameter relatively small, but for a large-size cylindrical workpiece, the arrangement of a plurality of the working electrodes 3 and the auxiliary electrodes 9 as shown in FIG. 10 such that the cycle be in the range from 20 to 200 ms, may provide more efficient mirror-finishing.

The description hereinafter will discuss apparatus for mirror-finishing a cylindrical workpiece in accordance with the present invention.

Firstly, the description will be made in detail of a first embodiment of apparatus with reference to FIGS. 11 and 12.

Figure 11:
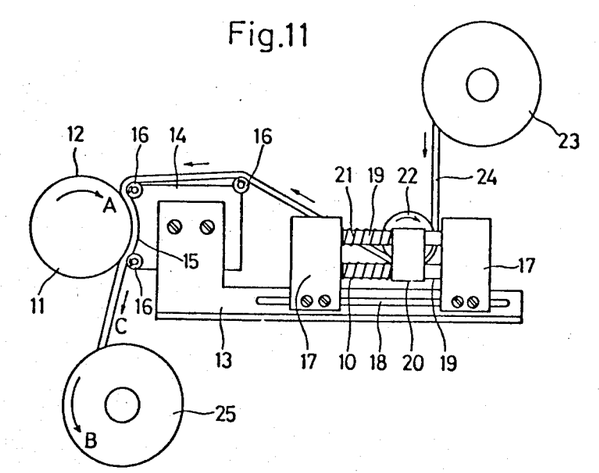
FIG. 11 is a front view of a first embodiment of apparatus for mirror-finishing a cylindrical workpiece according to the present invention.
Figure 12:
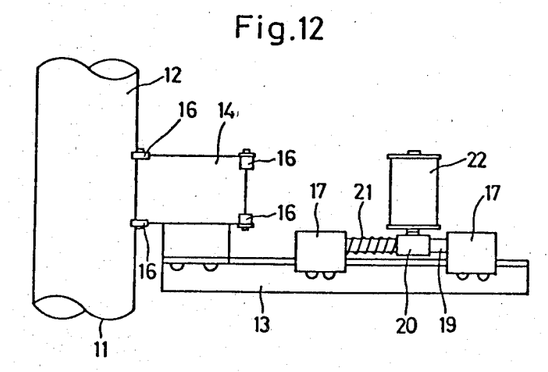
FIG. 12 is a plan view of the apparatus shown in FIG. 11 with portions removed.

In FIGS. 11 and 12, a cylindrical workpiece 11 having an outer surface 12 is adapted to be rotated in the direction of the arrow A. A working electrode 14 mounted on a base 13 has an electrode surface 15, which is formed into a concaved curved surface having a radius slightly larger than the radius of the outer surface 12 of the cylindrical workpiece 11. This electrode surface 15 is disposed adjacent to the cylindrical workpiece 11. Guide rollers 16 are disposed at the both sides of the both ends of the electrode surface 15 and at suitable portions of the working electrode 14. Two support stands 17 are fixed to suitable portions of a groove 18 formed in the base 13. Two support rods 19 are mounted between the support stands 17.

A support member 20 is movably mounted to the support rods 19. Springs 21 disposed between the support member 20 and one support stand 17 apply spring-load to the support member 20 in the right direction in FIG. 11. A tension roller 22 is rotatably attached to the support member 20.

A reel 23 is disposed for a band-shape abrasive matter 24. A take-up roller 25 is adapted to be rotated in the direction of the arrow B by a driving mechanism. The abrasive matter 24 taken out from the reel 23 is guided to the gap between the cylindrical workpiece 11 and the electrode surface 15 of the working electrode 14 through the tension roller 22 and the respective guide rollers 16. Thus guided abrasive matter 24 is slidably contacted with and pressed to the outer surface 12 of the cylindrical workpiece 11 through the electrode surface 15, and is then taken up by the take-up roller 25. Here, it is to be noted that tension is applied to the abrasive matter by the tension roller 22.

The cylindrical workpiece 11 is connected to the anode of a power supply and the working electrode 14 is connected to the cathode of the power supply. An electrolyte is supplied to the gap between the electrode surface 15 and the outer surface 12 of the cylindrical workpiece 11 through a bore in the working electrode 14 from an electrolyte supply device, and electrolysis is performed with a voltage of a few V to about 15 V and an electrolytic current density of about 10 A/cm$^2$ or less.

The take-up roller 25 is rotated by a driving mechanism in the direction of the arrow B at a speed lower than the peripheral speed of the cylindrical workpiece 11. The abrasive matter to which tension is applied by the tension roller 22, is pressed to the cylindrical workpiece 11 through the electrode surface 15 and is moved in the direction of the arrow C to be taken up by the take-up roller 25. If the abrasive matter feed speed becomes uneven, the support member 20 is moved by the springs 21 to move the tension roller 22, thereby to adjust tension to be applied to the abrasive matter 24, whereby the abrasive matter feed speed is maintained constant.

Figure 13:
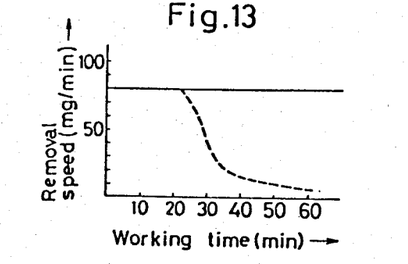
FIG. 13 is a characteristic curve showing the relationship between the finishing time and the removal speed.

As shown by the solid line in FIG. 13, the removal speed of the outer surface 12 of the cylindrical workpiece 11 is not lowered but maintained constant with the passage of working time. Such constant operation is resulted from the automatic feed of the abrasive matter 24. Thus, the outer surface 12 of the cylindrical workpiece 11 may be mirror-finished so as to have surface roughness of 0.1 μm Rmax or less. The broken line in FIG. 13 shows a removal speed obtained with a conventional polishing apparatus in which abrasive matter is not fed. In such a case, the removal speed was lowered with the passage of working time. With the cylindrical workpiece peripheral speed being 3 m/sec. and the working electrode feed speed being 8 mm/min., the cylindrical workpiece removal speed was lowered to about ½ of the initial removal speed after about 30 minutes and the original surface remained as not treated due to the insufficiency of a removal amount of the surface to be treated.

On the other hand, when a used abrasive matter is replaced with a new one with operation interrupted, excessive abrasive traces appear on the surface to be treated due to sudden increase in abrasive force by such replacement. Thus, a uniformly treated surface may not be obtained and the working efficiency is decreased.

However, according to the mirror-finishing apparatus of the present invention, the provision of an abrasive matter feed mechanism capable of automatically feeding a band-shape abrasive matter eliminates the necessity of replacement of used abrasive matter as conventionally required and permits to realise a continuout long-term mirror-finishing. Thus, the working efficiency may remarkably be improved and a mirror-finished surface having uniform surface roughness may be obtained with higher accuracy.

Figure 14:
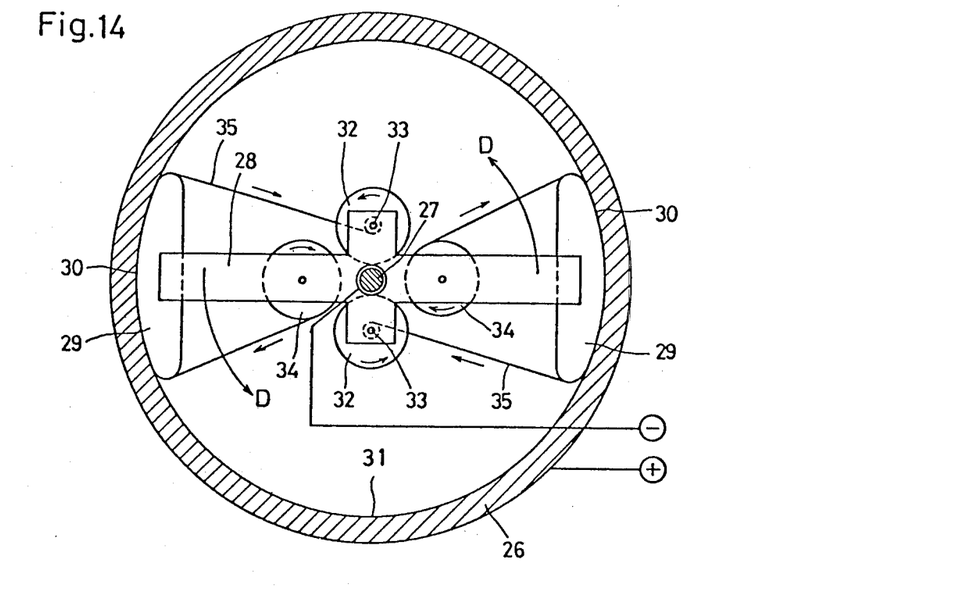
FIGS. 14 to 19 are front views of another six embodiments of mirror-finishing apparatus according to the present invention, respectively.

The description will then be made of an embodiment of apparatus for mirror-finishing the inner surface of a cylindrical workpiece with reference to FIG. 14.

A cylindrical workpiece 26 is connected to the anode of a power supply. A support shaft 27 located at the axis of the cylindrical workpiece 26 is fixed to a drive means (not shown) to move the support shaft 27 axially of the cylindrical workpiece 26 and is connected to the cathode of the power supply. A frame 28 is mounted on the support shaft 27 through a rotary bearing or the like and is provided at the ends thereof with abrasive heads 29, respectively. The frame 28 is rotated around the support shaft 27 in the direction of the arrow D by a swivelling device (not shown).

Each of the abrasive heads 29 is provided with a working electrode having an electrode surface 30 formed into a convexed curved surface having a radius substantially equal to that of the inner surface of the cylindrical workpiece 26, a pressing means for pressing the electrode surface 30 of the working electrode to the inner surface 31 of the cylindrical workpiece 26 by spring or hydraulic means, and an electrolyte supply device for supplying an electrolyte to the gap between the electrode surface 30 and the inner surface 31 of the cylindrical workpiece 26.

By feeder brushes or the like, the working electrodes are connected to the support shaft 27 connected to the cathode of the power supply.

Disposed at the frame 28 are rotary members 32 such as rollers in contact with the support shaft 27 or gears meshed with the gears disposed to the support shaft 27. Wound upon the rotary shafts 33 of the rotary members 32 are abrasive matters 35, which are taken out from the abrasive matter reels 34 attached to the frame 28 and cover the electrode surfaces 30 of the abrasive heads 29.

For these abrasive matters 35, there are used resilient non-woven abrasive matters having water-permeable and insulating properties, to which abrasive grains are attached.

The description hereinafter will discuss the operation of the apparatus shown in FIG. 14.

In the status shown in FIG. 14, when the electrode surfaces 30 of the abrasive heads 29 are pressed to the inner surface 31 of the cylindrical workpiece 26 at a predetermined pressing force and the frame 28 is rotated in the direction of the arrow D simultaneously with the application of an electrolytic voltage, the inner surface 31 of the cylindrical workpiece 26 is electrolysed and abrased according to a liquation operation by electrolysis in combination with an abrasive operation by the abrasive matters 35. The rotary shafts 32 in contact or in engagement with the fixed support shaft 27 are rotated around the support shaft 27. The abrasive matters 35 passing on the electrode surfaces 30 are then wound upon the rotary shafts 33 of the rotary members 32 and, at the same time, new abrasive matters 35 are taken out to the electrode surfaces 31 from the reels 34. Furthermore, simultaneously with the rotation of the frame 28, the support shaft 27 is axially advanced at a constant speed and the abrasive heads 29 are axially moved at a constant speed while rotating in the inner surface 31 of the cylindrical workpiece 26, thereby to uniformly polish the inner surface 31 of the cylindrical workpiece 26.

The abrasive matter taking-up speed is dependent on the number of rotations of the frame 28, the ratio of the support shaft diameter to the rotary member diameter and the dimensions of the rotary shafts 33, which are determined based on the service life of the abrasive matters 35.

For example, when the pressing force of the abrasive matter is 0.5 to 1 kgf/cm$^2$ and the abrasing speed of the abrasive matter is 1 to 2 m/s, the abrasive matter service life will be 40 to 60 min. When the inner diameter of the cylindrical workpiece 26 is 1 m and the circumpherential size of the working electrode is 0.3 m, the abrasive matter taking-up speed will be 0.2 to 0.4 mm or more per one rotation of the abrasive head. The dimensions of the support shaft 27, the rotary members 32 and the rotary shafts 33 are therefore obtained from this abrasive matter taking-up speed. It is possible to reduce the abrasive matter taking-up speed by disposing intermediate gears or the like as necessary.

Figure 15:
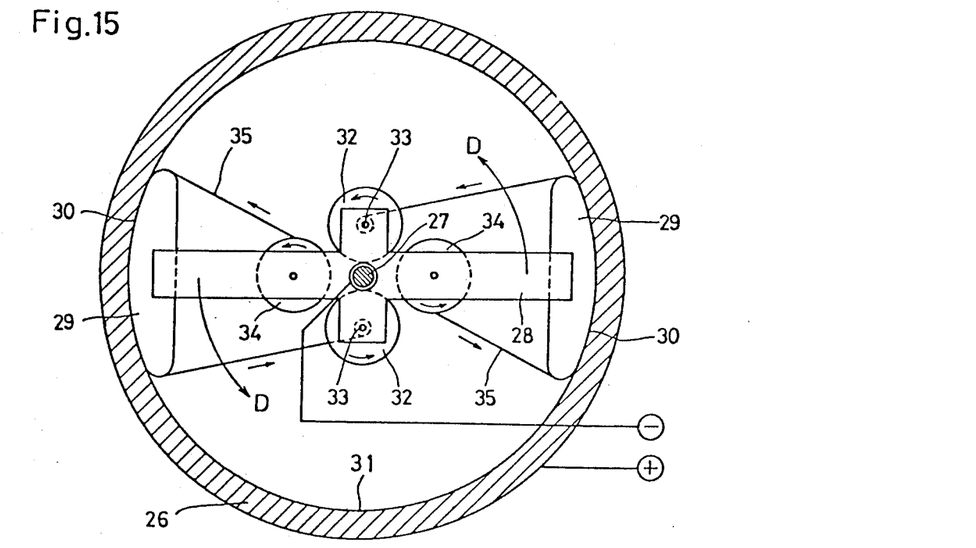

While the abrasive matters 35 are taken up in the reverse direction with respect to the abrasive direction shown by the arrow D in the embodiment in FIG. 14, the abrasive matters 35 may be taken up in the same direction as the abrasive direction as shown in FIG. 15.

The description hereinafter will discuss another embodiment of apparatus for mirror-polishing the inner surface of a cylindrical workpiece with reference to FIG. 16.

As in the embodiment mentioned earlier, a cylindrical workpiece 26 is connected to the anode of a power supply. A support shaft 36 located at the axis of the cylindrical workpiece 26 is fixed to a drive means (not shown) to axially move the support shaft 36 and is connected to the cathode of the power supply.

A frame 37 is mounted on the support shaft 36 through a rotary bearing or the like, and is provided at the ends thereof with abrasive heads 38.

This frame 37 is adapted to be rotated around the support shaft 36 in the direction of the arrow D by a swivelling means (not shown). Each of the abrasive heads 38 comprises a working electrode having an electrode surface 39 formed into a convexed curved shape having a radius substantially equal to that of the inner surface 31 of the cylindrical workpiece 26, a pressing means for pressing the electrode surface 39 of the working electrode to the inner surface 31 of the cylindrical workpiece 26 by spring or hydraulic means, and an electrolyte supply means for supplying an electrolyte to the gap between the electrode surface 39 and the inner surface 31 of the cylindrical workpiece 26. By feeder brushes or the like, the working electrodes are connected to the support shaft 36 connected to the cathode of the power supply.

Two pressing rollers 40 are slidably disposed at the frame 37 along respective slots 41 formed in the frame 37, and are pressed to the support shaft 36 by springs 42.

An abrasive belt 43 is wound on the electrode surfaces 39 of the abrasive heads 38 and is extended between the support shaft 36 and the both rollers 40, which press the abrasive belt 43 to the support shaft 36. For the abrasive belt 43, there is used a resilient non-woven abrasive matter having water-permeable and insulating properties, to which abrasive grains are attached.

An abrasive belt pressing means is constituted by the rollers 40, the slots 41 and the springs 42.

The description hereinafter will discuss the operation of the apparatus shown in FIG. 16.

Figure 16:
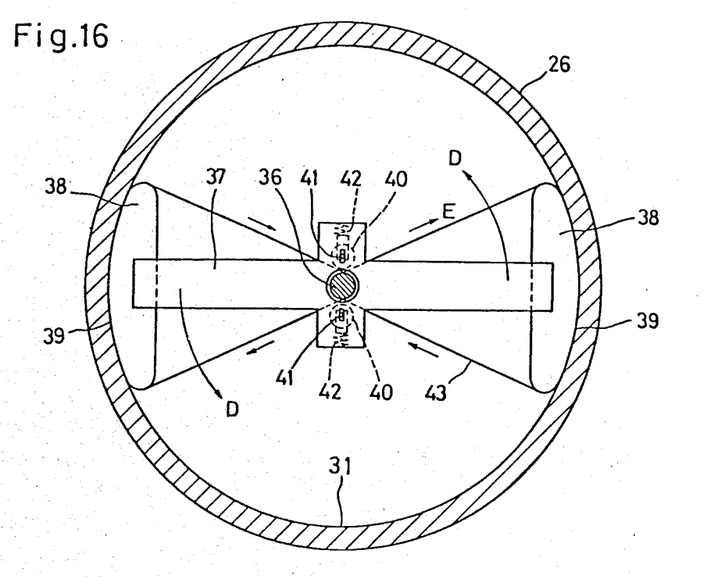

In the status shown in FIG. 16, when the electrode surfaces 39 of the abrasive heads 38 are pressed to the inner surfaces 31 of the cylindrical workpiece 26 at a predetermined pressing force and the frame 37 is rotated in the direction of the arrow D simultaneously with the application of an electrolytic voltage, the inner surface 31 of the cylindrical workpiece 26 is electrolysed and abrased by electrolysis in combination with abrasion by the abrasive belt 43.

The abrasive belt 43 pressed to the fixed support shaft 36 by the pressing rollers 40 is also rotated and is circulatingly moved on the electrode surfaces 39 of the abrasive heads 38 in the direction of the arrow E opposite to the abrasion direction of the arrow D. Furthermore, simultaneously with the rotation of the frame 37, the support shaft 36 is axially advanced at a constant speed. The abrasive heads 38 are rotated and axially advanced in the inner surface 31 of the cylindrical workpiece 26, thereby to uniformly polish the inner surface 31 of the cylindrical workpiece 26.

Figure 17:
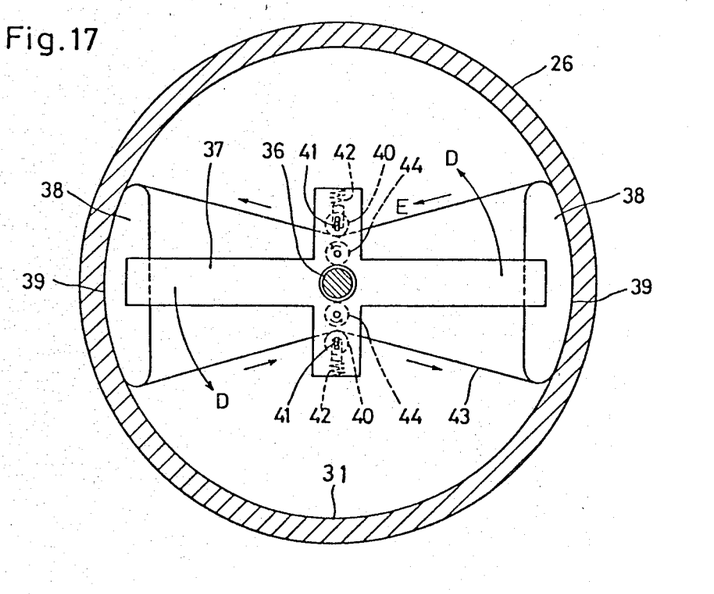

While the abrasive belt 43 is circulated in the direction opposite to the abrasive direction of the arrow D in the embodiment shown in FIG. 16, it is possible to circulate the abrasive belt 43 in the same direction as the abrasive direction of the arrow D, as shown in FIG. 17, by disposing intermediate rollers 44 or gears between the support shaft 36 and the pressing rollers 40 and disposing the abrasive belt 43 between the rollers 40 and 44.

The description hereinafter will discuss further embodiment of apparatus for mirror-finishing the inner surface of the cylindrical workpiece with reference to FIG. 18.

Likely in the embodiment mentioned earlier, a cylindrical workpiece 26 is connected to the anode of a power supply. A support shaft 45 located at the axis of the cylindrical workpiece 26 is fixed to a drive means (not shown) to axially move the support shaft 45 and is connected to the cathode of the power supply.

A frame 46 is mounted on the support shaft 45 through a rotary bearing and is provided at the both ends thereof with abrasive heads 47. The frame 46 is adapted to be rotated around the support shaft 45 in the direction of the arrow D by a swivelling means (not shown).

Each of the abrasive heads 47 comprises a working electrode having an electrode surface 48 formed into a convexed surface having a radius substantially equal to the radius of the inner surface 31 of the cylindrical workpiece 26, a pressing means for pressing the electrode surface 48 of the working electrode to the inner surface 31 of the cylindrical workpiece 26 by spring or hydraulic means, and an electrolyte supply means for supplying an electrolyte to the gap between the electrode surface 48 and the inner surface 31 of the cylindrical workpiece 26. By feeder brushes or the like, the working electrodes are connected to the support shaft 45 connected to the cathode of the power supply.

Attached to the frame 46 are two auxiliary rotary members 49 such as rollers in contact with the support shaft 45 or gears meshed with the gears disposed at the support shaft 45.

Furthermore, two rotary members 50 are slidably disposed at the frame 46 along the respective slots 51 formed in the frame 46. The rotary members 50 are pressed to the auxiliary rotary members 49 by springs 52, and each of two abrasive belts 53 is wound upon each of the electrode surfaces 48 and each of the rotary members 50. For the abrasive belts 53, there are used resilient non-woven abrasive matters having water-permeable and insulating properties, to which abrasive grains are attached.

The description hereinafter will discuss the operation of apparatus shown in FIG. 18.

Figure 18:
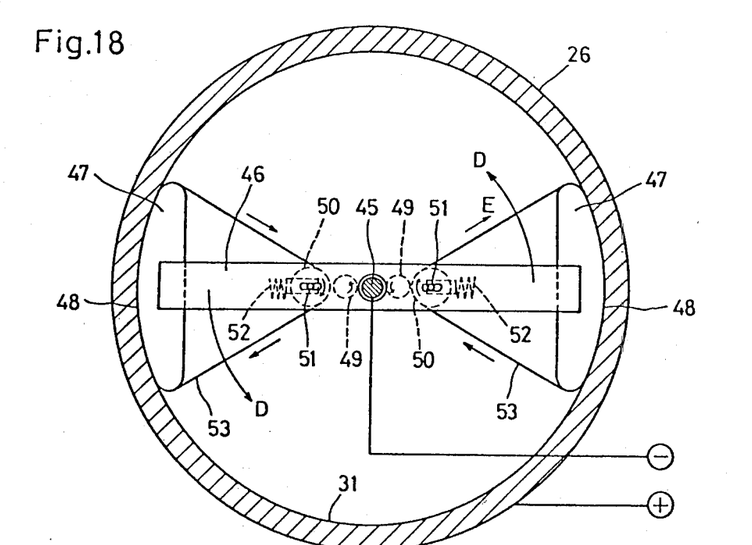

In the status shown in FIG. 18, when the electrode surfaces 48 of the abrasive heads 47 are pressed to the inner surface 31 of the cylindrical workpiece 26 at a predetermined pressing force and the frame 46 is rotated in the direction of the arrow D simultaneously with the application of an electrolytic voltage, the inner surface 31 of the cylindrical workpiece 26 is electrolysed and abrased by electrolysis in combination with abrasion by the abrasive belts 53.

The auxiliary rotary members 49 in contact or meshed with the fixed support shaft 45 are rotated around the support shaft 45. The abrasive belts 53 pressed to the auxiliary rotary members 49 by the rotary members 50 are rotated in the direction of the arrow E and are circulatingly moved on the electrode surfaces 48 of the abrasive heads 47 in the direction opposite to the abrasive direction of the arrow D. Simultaneously with the rotation of the frame 46, the support shaft 45 is axially advanced at a constant speed and the abrasive heads 47 are rotated and axially advanced in the inner surface 31 of the cylindrical workpiece 26 at a constant speed, thereby to uniformly polish the inner surface 31 of the cylindrical workpiece 26.

Figure 19:
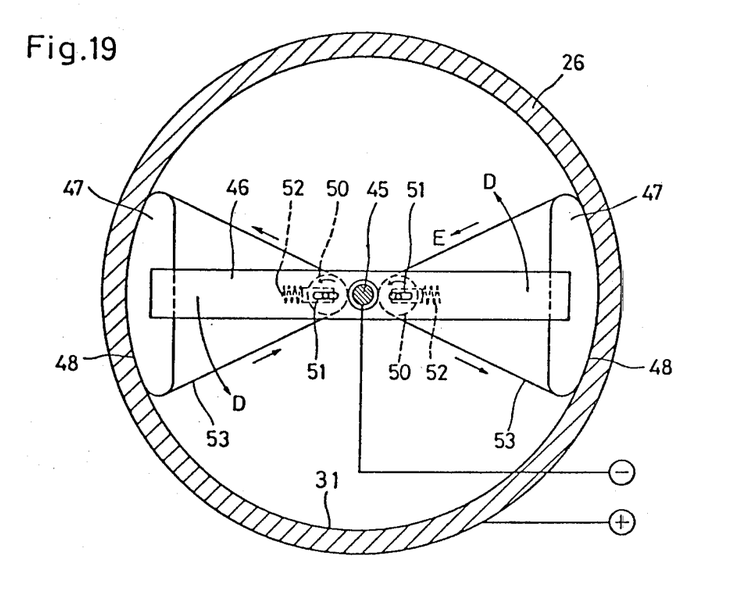

While the abrasive belts 53 are circulated in the direction opposite to the abrasive direction of the arrow D in the embodiment shown in FIG. 18, it is possible to circulate the abrasive belts 53 in the same direction as the abrasive direction, as shown in FIG. 19, by pressing the rotary members 50 directly to the support shaft 45.

As thus discussed hereinbefore, according to the apparatus for mirror-finishing a cylindrical workpiece of the present invention, liquation by electrolysis combined with mechanical abrasion permits the outer surface or the inner surface of a particularly large-size cylindrical workpiece to be mirror-polished, and the circulation of abrasive belts sufficiently longer than the size of the electrode surfaces of working electrodes permits to realise a long-term polishing operation and to provide a uniform mirror-finished surface. Thus, the present invention provides a highly effective and economical apparatus.

What we claim:

1. An apparatus for mirror-finishing a cylindrical workpiece, said workpiece being connected to the anode of a power supply, said apparatus comprising:
  working electrodes disposed oppositely to the cylindrical workpiece, said working electrodes being connected to the cathode of the power supply,
  the electrode surfaces of said working electrodes being formed into curved surfaces substantially conforming to the curved surface of the cylindrical workpiece being treated;

band-shape abrasive matters disposed between the surface of the workpiece to be treated and each of said electrode surfaces, the band-shape abrasive matters being in contact with the surface to be treated;

abrasive matter feed mechanism means for moving said band-shape abrasive matters with respect to the surface to be treated;

an electrolyte in the gap between each of said electrode surfaces and the surface to be treated, said electrolyte being in a passive state;

a swivelling mechanism for swivelling, in a circumferential direction, said working electrodes relative to the surface of the cylindrical workpiece to be treated; and a moving mechanism for moving, in an axial direction, said working electrodes relative to the surface of the cylindrical workpiece to be treated.

2. A mirror finishing apparatus as set forth in claim 1, wherein the electrode surfaces of the working electrodes are formed into concaved curved surfaces having a radius slightly larger than that of the outer surface of the cylindrical workpiece;

the abrasive matter feed mechanism means comprising abrasive matter reels on which the band-shape abrasive matters are wound, guide rollers for guiding the abrasive matters taken out from said abrasive matter reels to the gaps between each of said electrode surfaces and the outer surface of the cylindrical workpiece, and take-up rollers for receiving and taking up said abrasive matters; and the swivelling mechanism is so constructed as to rotate the cylindrical workpiece.

3. A mirror-finishing apparatus as set forth in claim 1, wherein the electrode surfaces of the working electrodes are formed into convexed curved surfaces having a radius slightly smaller than that of the inner surface of the cylindrical workpiece;

the swivelling mechanism comprises a support shaft located at the axis of the cylindrical workpiece, and a frame adapted to be rotated around said support shaft and provided at the ends thereof with the working electrodes; and the moving mechanism is so constructed as to move said swivelling mechanism axially of the cylindrical workpiece.

4. A mirror-finishing apparatus as set forth in claim 3, wherein the abrasive matter feed mechanism means comprises the abrasive matter reels mounted on the frame and upon which the abrasive matters are wound, and rotary members adapted to be rotated by the support shaft and for winding up the abrasive matters which have been taken out from said abrasive matter reels and have passed on the electrode surfaces.

5. A mirror-finishing apparatus as set forth in claim 3, wherein a plurality of working electrodes are mounted on the frame, the abrasive band is wound in an endless manner on the respective electrode surfaces of said plurality of working electrodes, the abrasive matter feed mechanism means comprises rollers mounted on the frame and for pressing the abrasive matter to the support shaft, and the abrasive matter is circulatingly moved onto said plurality of working electrodes.

6. A mirror-finishing apparatus as set forth in claim 3, comprising rotary members rotatably mounted to the frame, and abrasive bands wound in an endless manner on said rotary members and the electrode surfaces of the working electrodes, the abrasive bands being pressed to the support shaft by said rotary members, the abrasive bands being circulated simultaneously with the swivelling of the working electrodes.

* * * * *